US010125543B2

(12) United States Patent
Ebbesen

(10) Patent No.: US 10,125,543 B2
(45) Date of Patent: Nov. 13, 2018

(54) ACCESS SYSTEM FOR A HUB OF A WIND TURBINE

(71) Applicant: SIEMENS AKTIENGESELLSCHAFT, München (DE)

(72) Inventor: Henning Ebbesen, Skjern (DK)

(73) Assignee: SIEMENS AKTIENGESELLSCHAFT (DE)

(*) Notice: Subject to any disclaimer, the term of this patent is extended or adjusted under 35 U.S.C. 154(b) by 1085 days.

(21) Appl. No.: 14/336,259

(22) Filed: Jul. 21, 2014

(65) Prior Publication Data
US 2015/0078914 A1    Mar. 19, 2015

(30) Foreign Application Priority Data

Aug. 14, 2013 (EP) ...................... 13180434

(51) Int. Cl.
E06C 9/02 (2006.01)
F03D 80/50 (2016.01)
F03D 80/00 (2016.01)
F03D 1/06 (2006.01)

(52) U.S. Cl.
CPC .............. E06C 9/02 (2013.01); F03D 1/0691 (2013.01); F03D 80/00 (2016.05); F03D 80/50 (2016.05); Y02E 10/721 (2013.01)

(58) Field of Classification Search
CPC ........ F03D 80/00; F03D 80/50; F03D 1/0691; F03D 1/003
USPC ............................... 182/194, 228.1
See application file for complete search history.

(56) References Cited

U.S. PATENT DOCUMENTS

| 247,416 | A | * | 9/1881 | Row | E06C 7/08 |
| | | | | | 182/194 |
| 366,825 | A | * | 7/1887 | French | E06C 1/56 |
| | | | | | 182/196 |
| 8,061,999 | B2 | * | 11/2011 | Bagepalli | F03D 80/50 |
| | | | | | 415/123 |

(Continued)

FOREIGN PATENT DOCUMENTS

DE    202012006595 U1 *    8/2012    ........... F03D 1/0691

OTHER PUBLICATIONS

DE 202012006595 U1 Machine Translation.*
Extended European Search Report, Application No. 13180434.6, dated Jan. 13, 2014; 4 pgs.

Primary Examiner — Logan Kraft
Assistant Examiner — John S Hunter
(74) Attorney, Agent, or Firm — Schmeiser, Olsen & Watts, LLP

(57) ABSTRACT

An access system for a hub of a wind turbine, wherein the hub comprises a first flange for mounting a first rotor blade, a second flange for mounting a second rotor blade and a third flange for mounting a third rotor blade is provided. The hub comprises a first opening, a second opening and at least a third opening, each of the openings being suitable for accessing an interior of the hub from outside of the hub. The access system comprises a first ladder with a plurality of first rungs, the first ladder extending inward from the first opening, a second ladder with a plurality of second rungs, the second ladder extending inward from the second opening, and a third ladder with a plurality of third rungs, the third ladder extending inward from the third opening.

7 Claims, 8 Drawing Sheets

(56) References Cited

U.S. PATENT DOCUMENTS

2010/0129216 A1 5/2010 Bagepalli
2013/0302175 A1* 11/2013 Munk-Hansen ........ F03D 80/00
416/245 R

* cited by examiner

FIG 5
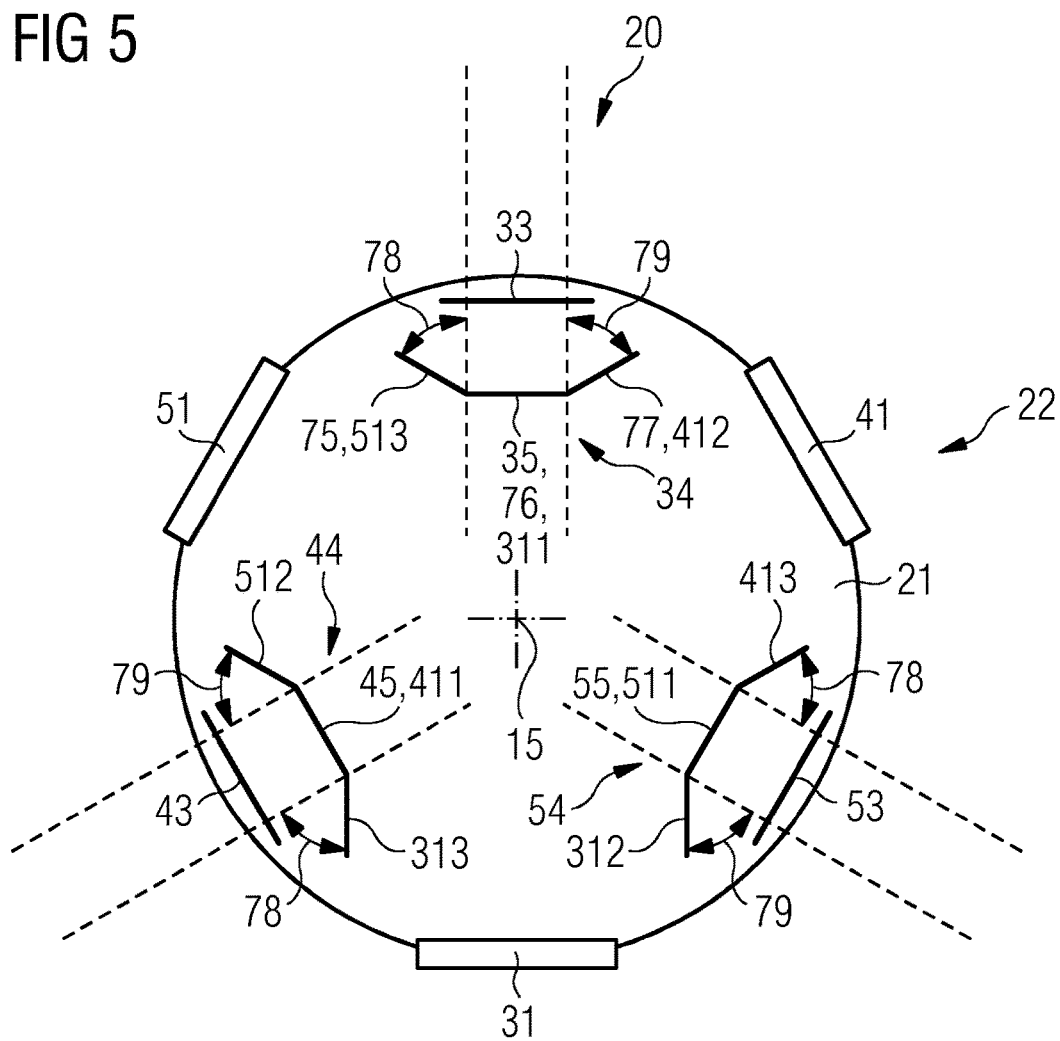
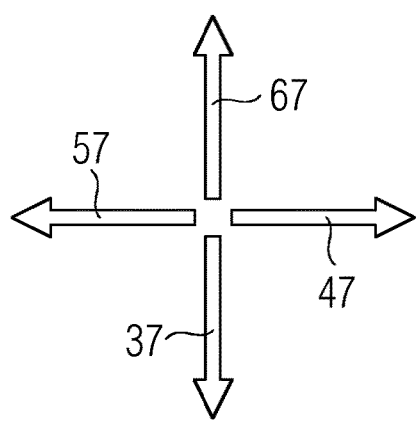

ACCESS SYSTEM FOR A HUB OF A WIND TURBINE

CROSS-REFERENCE TO RELATED APPLICATIONS

This application claims priority to EP Application No. 13180434.6, having a filing date of Aug. 14, 2013, the entire contents of which are hereby incorporated by reference.

FIELD OF TECHNOLOGY

The following relates to an access system for a hub of a wind turbine. In particular, the following relates to how a person may enter the hub of a geared wind turbine.

BACKGROUND

A wind turbine typically comprises a tower, a nacelle, a hub and a plurality of rotor blades. The rotor blades are attached to the hub. The hub with the rotor blades rotates about a rotor axis of rotation during operation of the wind turbine. In various occasions, a person, e.g. service staff, needs to enter the hub. It may be possible that straight access from the nacelle into the hub is possible. This may, for instance, be possible at gearless, direct drive wind turbines. However, this direct access may be obstructed. In geared wind turbines, typically a gear box impedes direct access from the nacelle into the hub. It should be noted, though, that also in gearless wind turbines direct access may be obstructed for other reasons.

Thus, openings in the hub which allow a person to enter the hub from outside of the hub may be present. Then, the hub is typically equipped with a ladder construction, comprising one ladder for each opening. If, for instance, there are three openings in the hub, three ladders inside the hub exist. If the opening is assumed to be located opposite to the rotor blade, safe and easy access to the hub is only possible if the rotor blade points downward, as only in this position rungs of the ladder are horizontal, and thus only in this position a comfortable and safe access using this ladder is possible. If, however, the rotor blade is in a different position the rungs of the ladder, the ladder being opposite to the rotor blade, are no longer horizontal and it is unsafe for a person entering the hub by the opening.

Thus, there exists an urgent need to provide an access system for a hub of a wind turbine, which allows easier and safer access to the hub compared to conventional access systems.

SUMMARY

An aspect relates to an access system for a hub of a wind turbine, wherein the hub may comprise a first flange for mounting a first rotor blade, a second flange for mounting a second rotor blade and a third flange for mounting a third rotor blade. The hub furthermore may comprise a first opening, a second opening and at least a third opening, each of the openings being suitable for accessing an interior of the hub from outside of the hub. The access system may comprise a first ladder with a plurality of first rungs, the first ladder extending inward from the first opening. The access system furthermore may comprise a second ladder with a plurality of second rungs, the second ladder extending inward from the second opening, and a third ladder with a plurality of third rungs, the third ladder extending inward from the third opening. At least the first ladder may comprise a first rail and a second rail, the second rail being substantially parallel to the first rail. Each of the first rungs may extend from the first rail to the second rail, comprising a first angle between the first rung and the first rail, and a second angle between the second rung and the second rail. Finally, the first angle and the second angle are each greater than 110 degrees.

A wind turbine is a device that can convert wind energy, e.g. kinetic energy from wind, into mechanical energy. The mechanical energy is subsequently used to generate electricity. A wind turbine is also referred to as a wind power plant or a wind charger. Furthermore, a wind turbine may also be referred to as a wind turbine engine.

A flange, e.g. the first flange and/or the second flange and/or the third flange, may have a shape of a ring, which is suited that a root of a rotor blade is attached to. The attachment or connection between the flange and the rotor blade may be performed by screws or bolts or clams. Opposite to each flange may be an opening. The opening comprises a diameter, which can be large enough so that a person can enter the hub from outside. For instance, the diameter of the opening can be larger than 1 meter.

In an exemplary embodiment, at least one of the three ladders comprises steel and/or aluminum because of the relatively high stability and robustness of steel and/or aluminum. Alternatively, at least one of the three ladders may comprise fibre glass because of the relatively light weight of fibre glass.

Embodiments of the wind turbine may comprise a plurality of rotor blades and a plurality of openings, wherein each opening may be located opposite to the rotor blade. In an exemplary embodiment, the wind turbine may include three rotor blades and three openings, wherein each opening is located opposite to a rotor blade. In a plane which is perpendicular to the rotor access of rotation, the hub may comprise a substantially circular shape. Then, the rotor blades, i.e. the flanges for mounting the rotor blades, and the openings may be equally distributed over the hub. In other words, an angle between two adjacent flanges can be approximately 120 degrees. Likewise, an angle between two adjacent flanges can be 120 degrees.

A ladder, e.g. the first ladder and/or the second ladder and/or the third ladder, comprises rails and rungs. A rung may comprise a plurality of components or units. Moreover, embodiments of the invention can increase the number of hub positions a person is able to enter the hub from outside through an opening, and is able to step on a horizontal rung of a ladder, compared to other access systems. As an example, three rotor blades, three openings and three ladders are assumed. Then, with a conventional ladder, where the rungs are perpendicular to the rails, only in three hub positions a person can enter the hub by one of the openings and is able to step on a horizontal rung. If however, the rungs are not perpendicular to the rails, and the angle between the rungs and the rails is greater than 110 degrees, than more hub positions with horizontal rungs may be possible.

In an exemplary embodiment, each of the ladders may comprise an outer end, which is directed towards one of the openings, and an inner end, which is opposite to the outer end. Additionally, the inner ends can be mechanically joined to each other. The individual ladders may be connected in the middle of the hub with a web type connection, that can increase the mechanical stability of the access system.

In some embodiments, the first angle has to be measured between the first rung and the first rail in a direction towards the inner end, and, likewise, the second angle has to be measured between the first rung and the second rail in a direction towards the inner end. In other words, the first angle and the second angle, which can be each greater than 110 degrees, can be both on the same side of the ladder, e.g. both pointing towards the inner end of the ladder.

In another exemplary embodiment, each of the first rungs comprises a first unit, a second unit and a third unit. A first unit may be attached to the first rail, the first angle may be built between the first rail and the first unit, the third unit may be attached to the second rail, the second angle may be built between the second rail and the third unit, and the second unit may connect the first unit and the third unit. The first unit, the second unit and the third unit each may comprise approximately the same length. In an exemplary embodiment, the second unit is substantially perpendicular to the first rail. Thus, the second unit may be arranged with regard to the rails like a rung is arranged with regard to the rail of a conventional ladder, while the first unit and the third unit are inclined with regard to the first rail and the second rail.

In another exemplary embodiment, each of the first rungs may be bent. In particular, each of the first rungs comprises a shape of an arc. By means of bent rungs, it is possible to only have one unit per rung and still achieve the first angle and the second angle each being greater than 110 degrees. Additionally, by means of bent rungs, it is possible to have a substantially horizontal rung to step on at any position of the hub.

In another exemplary embodiment, the first angle may be substantially equal to the second angle. This may simplify the manufacturing of the above described access system. Another exemplary embodiment is characterized in that the first angle is in a range between 115 degrees and 125 degrees and/or the second angle is in a range between 115 degrees and 125 degrees. The first angle and the second angle are approximately 120 degrees. In embodiments of a wind turbine with three rotor blades and three openings and three ladders, in nine hub positions a horizontal rung, i.e. a unit of a rung, is available for a person entering the hub by one of the openings.

In another embodiment, the hub may comprise a first position, wherein the first rotor blade points to a first direction which is defined by a direction of gravitational force acting on a first rotor blade. Furthermore, the hub may comprise a second position, wherein the first rotor blade points to a second direction which is rotated about 90 degrees in a counterclockwise rotational direction with regard to the first position. Furthermore, the hub may comprise a third position wherein the first rotor blade points to a third direction which is rotated about 90 degrees in a clockwise rotational direction with regard to the first position. Finally, for each of the positions, a plurality of rungs may be perpendicular to the direction where the first rotor blade points to.

The first position with the first rotor blade pointing in the direction of the gravitational force, i.e. pointing down, may be referred to as a normal service position. The second position with the first rotor blade pointing in the second direction, which is rotated about 90 degrees in a counterclockwise rotational direction, may be referred to as blade inspection position. The third position with the first rotor blade pointing opposite to the second position may be referred to as single blade installation position.

In yet another exemplary embodiment, the wind turbine may comprise a gearbox. In other words, a wind turbine is a geared wind turbine. The gearbox may obstruct a direct access between the nacelle and the hub to such an extent that a person cannot access the hub directly from the nacelle. Consequently, it can be advantageous for the person to enter by one of the openings and use the access system.

BRIEF DESCRIPTION

Some of the embodiments will be described in detail, with reference to the following figures, wherein like designations denote like members, wherein:

FIG. 5 shows an embodiment of an access system with depicted complementary angles;

Figure 1:
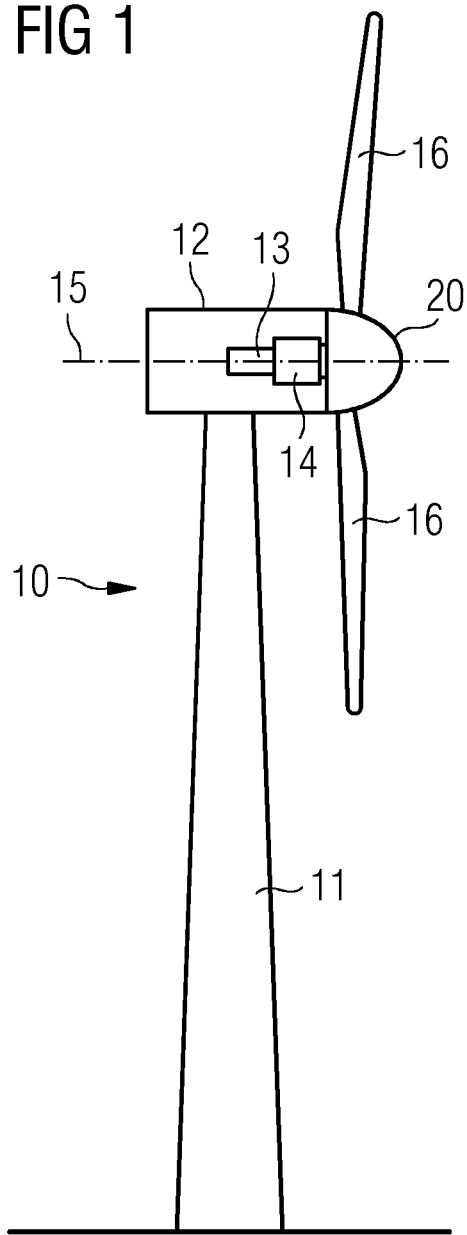
FIG. 1 shows an embodiment of a geared wind turbine.

The illustration in the drawings is schematical.

DETAILED DESCRIPTION

In FIG. 1, a wind turbine 10 with a tower 11, a nacelle 12, a hub 20 and rotor blades 16, the rotor blades 16 being attached to the hub 20, is shown. The nacelle 12 houses a gearbox 14 and a generator 13. Thus, the wind turbine 10 is a geared wind turbine 10. The hub 20 is rotatably mounted to the nacelle 12. The hub 20 is rotatable about a rotor access of rotation 15.

Figure 2:
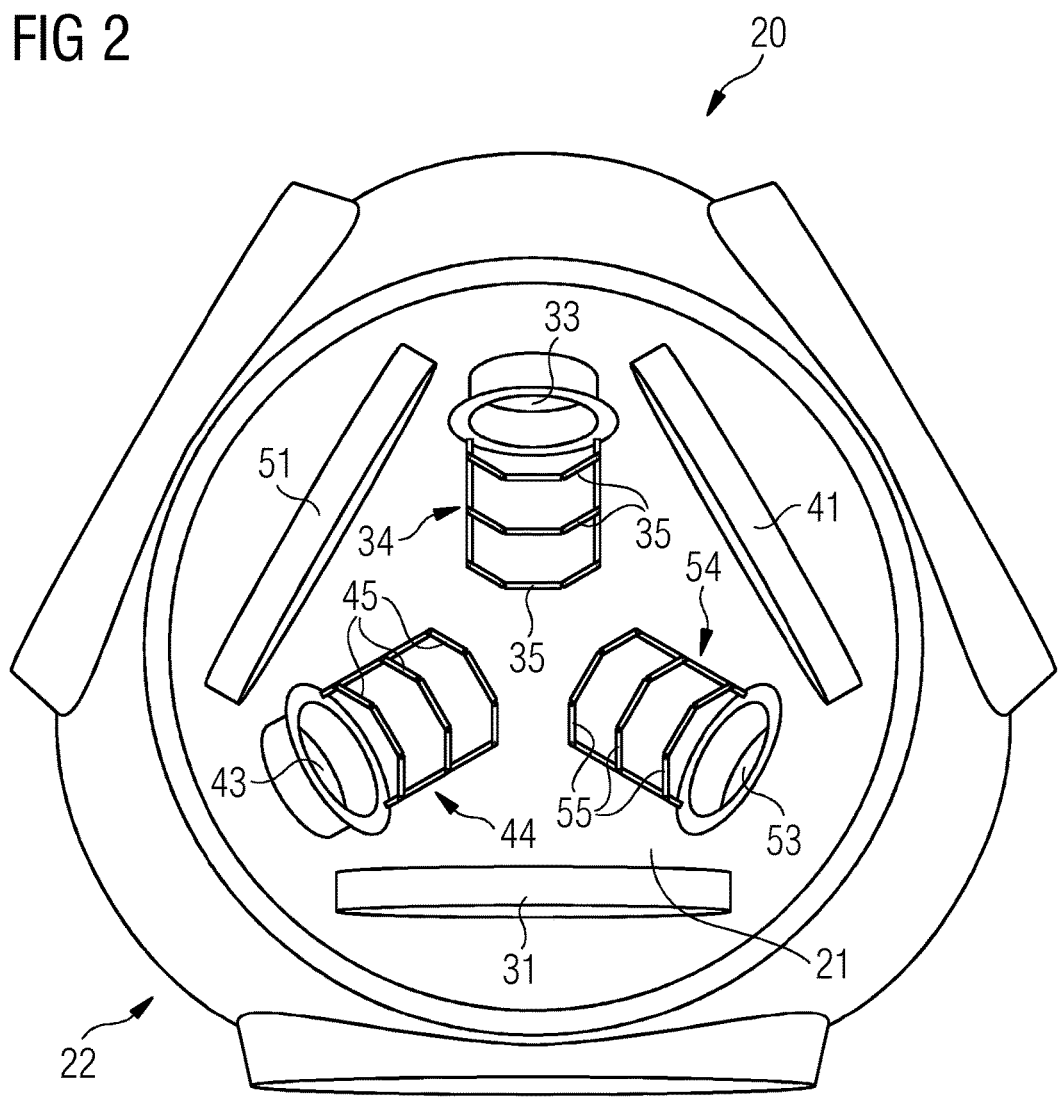
FIG. 2 shows an embodiment of a hub of a wind turbine with an access system.

FIG. 2 shows a hub 20 of a wind turbine 10. FIG. 2 furthermore shows an access system 60 comprising a first ladder 34, a second ladder 44 and a third ladder 54. The first ladder 34 comprises three first rungs 35, the second ladder 44 comprises three second rungs 45, and the third ladder 54 comprises three third rungs 55.

Figure 6:
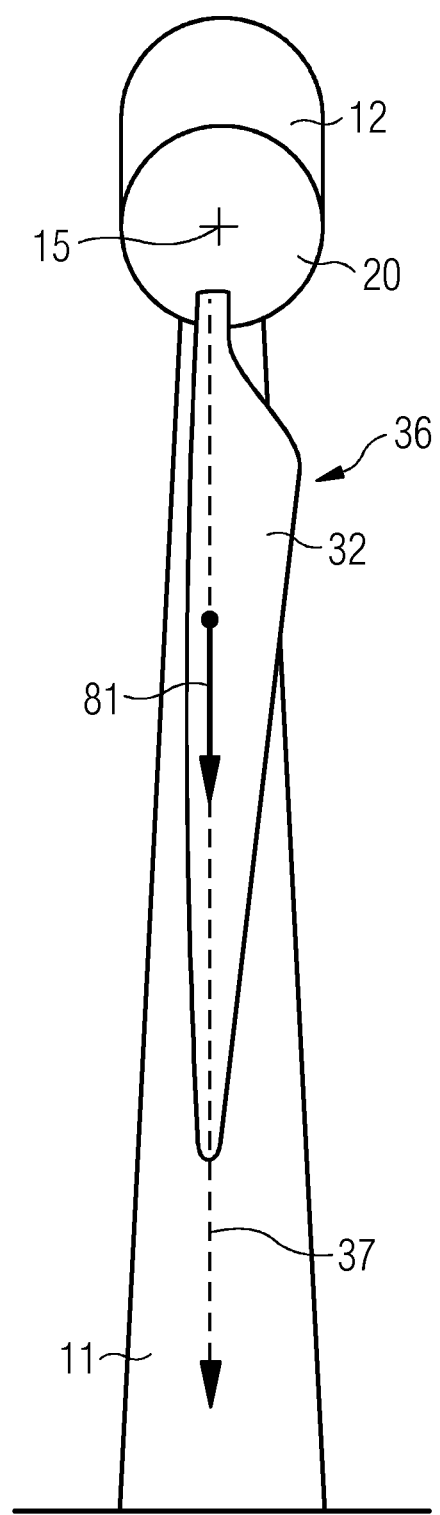
FIG. 6 shows an embodiment of a wind turbine with a first rotor blade in a first position.
Figure 7:
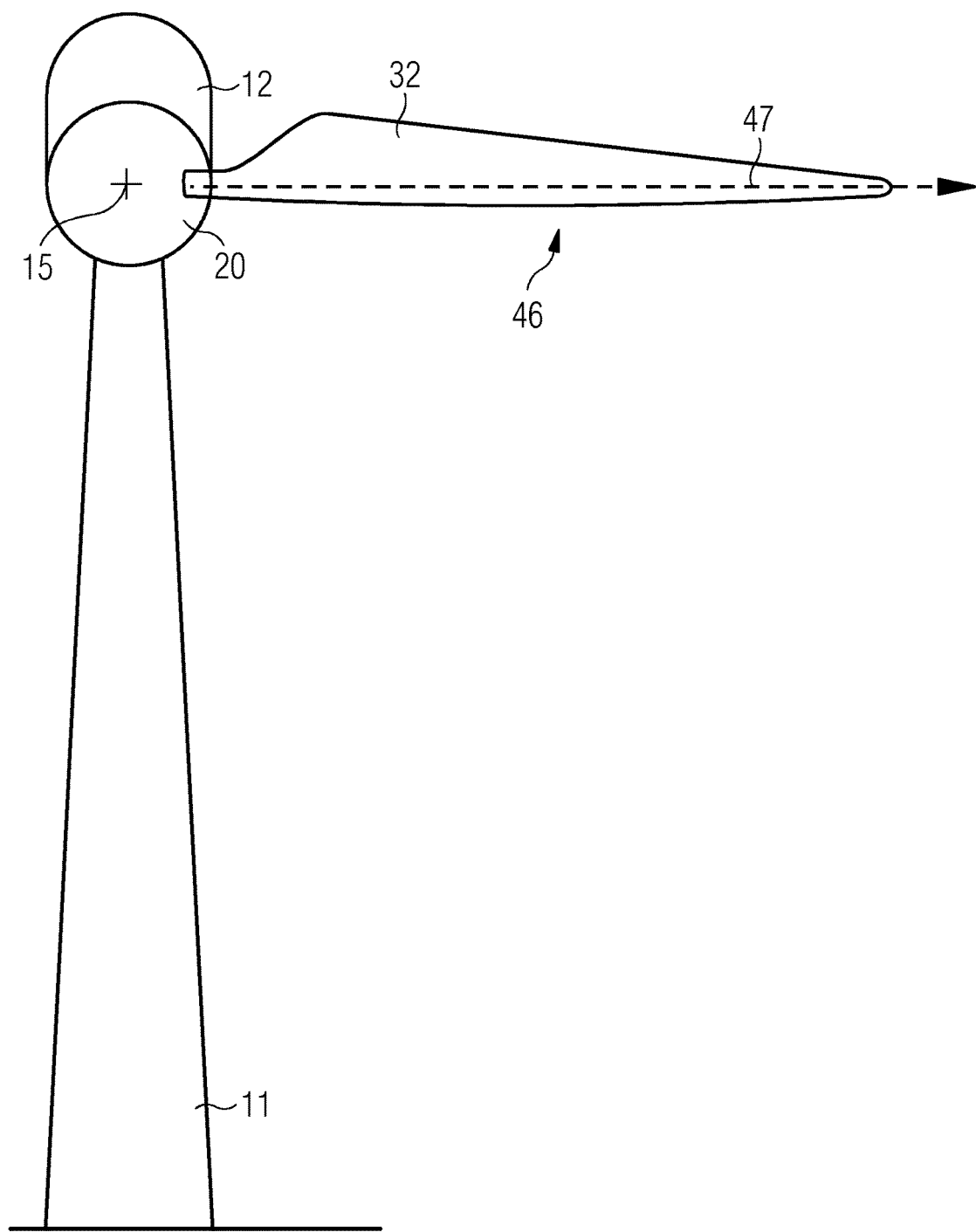
FIG. 7 shows an embodiment of a wind turbine with a first rotor blade in a second position.
Figure 8:
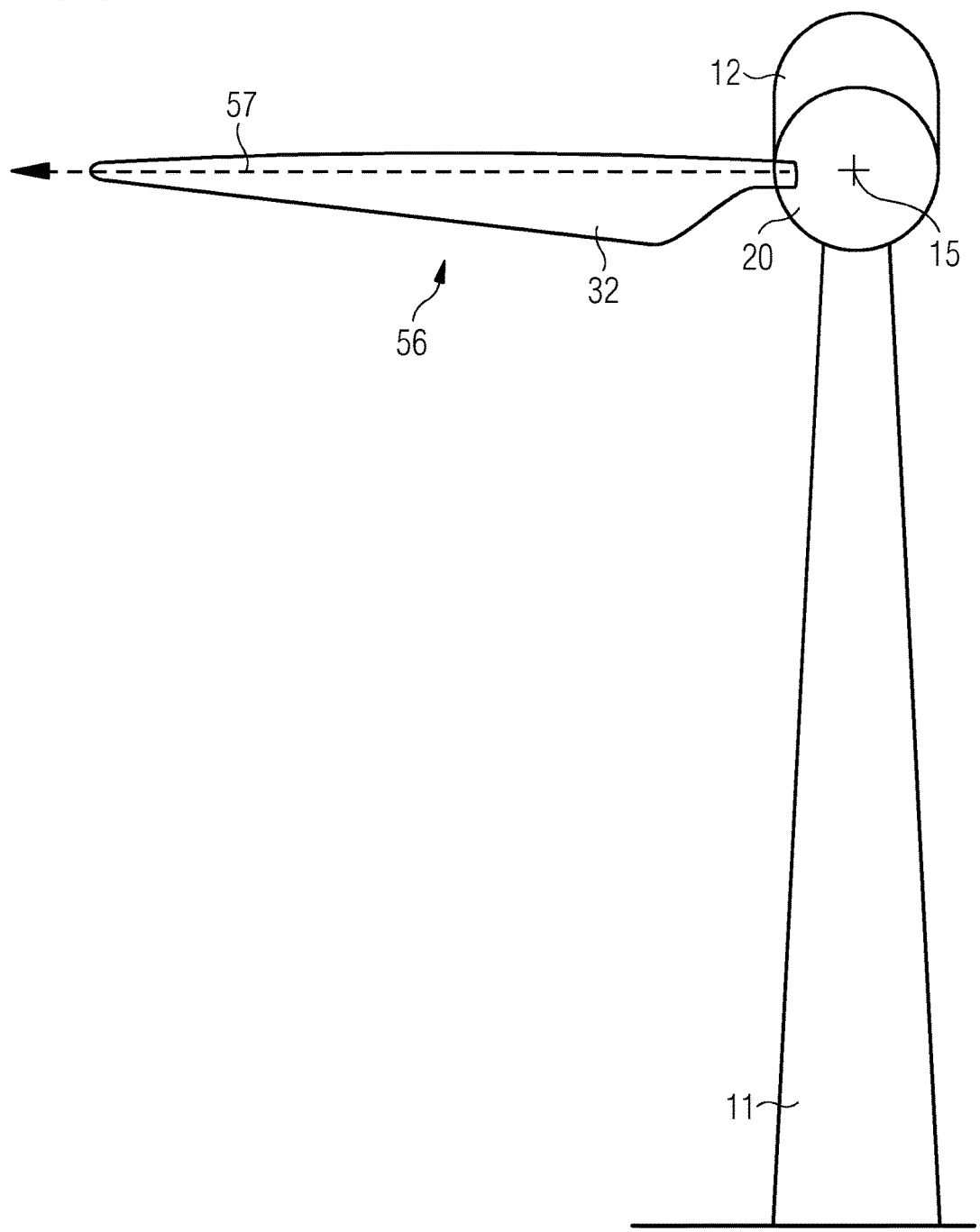
FIG. 8 shows an embodiment of a wind turbine with a first rotor blade in a third position.

The hub 20 furthermore comprises a first flange 31 for mounting a first rotor blade 32 (shown in FIGS. 6-8). Likewise, the hub also comprises a second flange 41 for a mounting a second rotor blade (not shown) and a third flange 51 for mounting a third rotor blade (not shown). Opposite to the first flange 31, the hub 20 comprises a first opening 33, from which the first ladder 34 is pointing towards an interior 21 of the hub 20. Likewise, the hub comprises a second opening 43, opposite to the second flange 41, and a third opening 53, opposite to the third flange 51. The dimensions, in particular a diameter, more particularly an inner diameter, of the openings 33, 43, 53 are such that a person can enter the hub 20 from the outside 22 towards the interior 21 of the hub 20.

Figure 3:
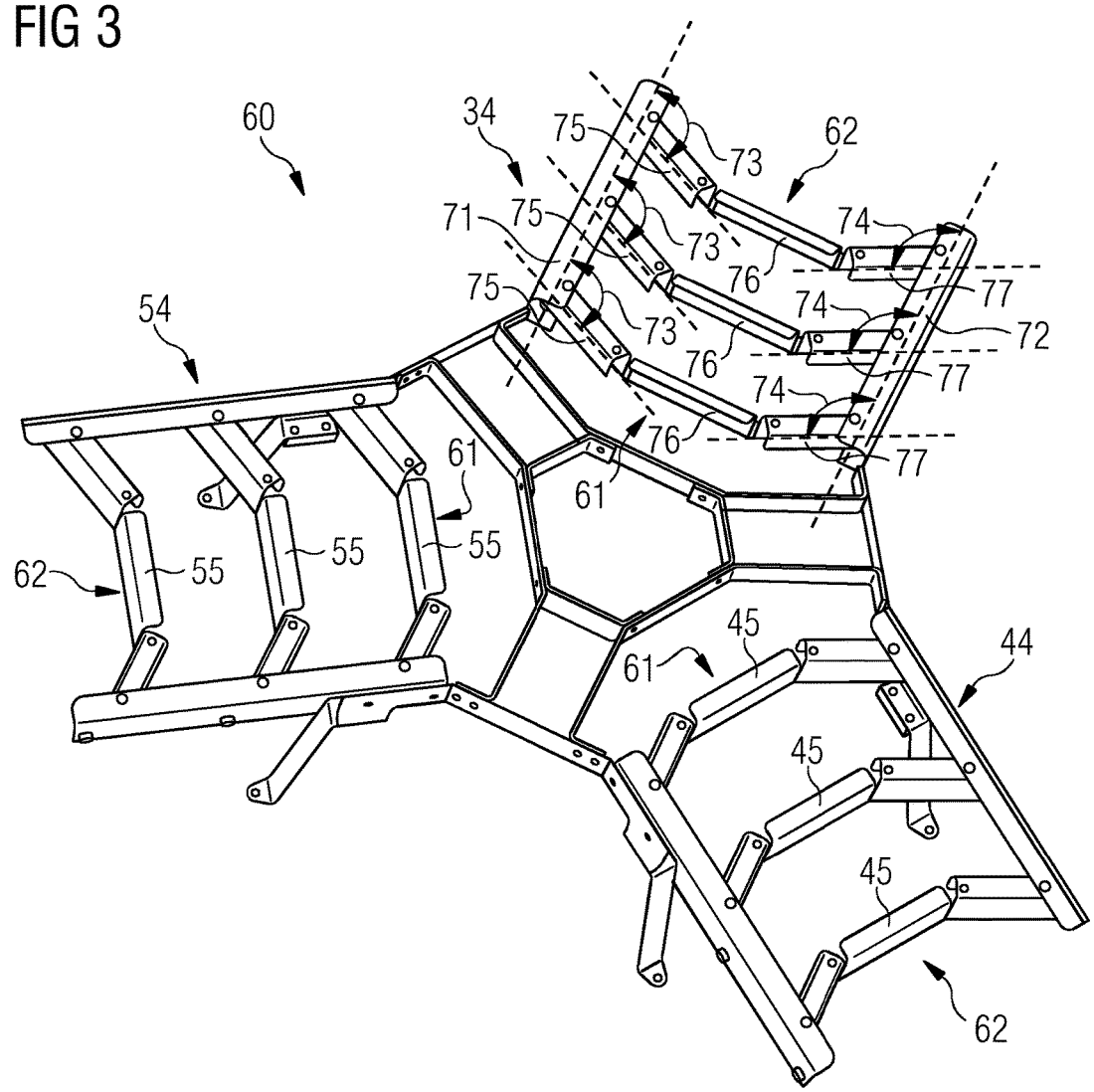
FIG. 3 shows an embodiment of an access system comprising a first ladder, a second ladder and a third ladder.

FIG. 3 shows an access system 60 for a hub 20 of a wind turbine 10, the access system 60 comprising a first ladder 34, a second ladder 44 and a third ladder 54, which are connected with each other. Each of the ladders 34, 44, 54 comprises an inner end 61 and an outer end 62. The ladders 34, 44, 54 are connected with each other at their inner ends 61. The first ladder 34 comprises three first rungs 35 in equal distance to each other, the second ladder 44 comprises three second rungs 45 in equal distance to each other, and the third ladder 54 comprises three third rungs 55 in equal distance to each other.

The first ladder 34 will in the following be explained in more detail. The second 44 and the third ladder 44 are similar to the first ladder 34. Thus, specifications and details explained in the following are also valid for the second 44 and third ladder 54. The first ladder 34 comprises a first rail 71 and a second rail 72 which are parallel to each other. Each of the three first rungs 35 comprises a first unit 75, a second unit 76 and a third unit 77. The second units 76 are perpendicular to the first rail 71 and the second rail 72. The first units 75 and the third units 77 are both inclined to the outer end 62 of the first ladder 34. A first angle 73 is built between the first rail 71 and the first unit 75, specifically on the side which is facing the outer end 62. Likewise, a second angle 74 is built between the second rail 72 and the third unit 77, again on the side which is facing the outer end 62. In some embodiments, the first angle 73 is 120 degrees and the second angle 74 is 120 degrees as well.

Figure 4:
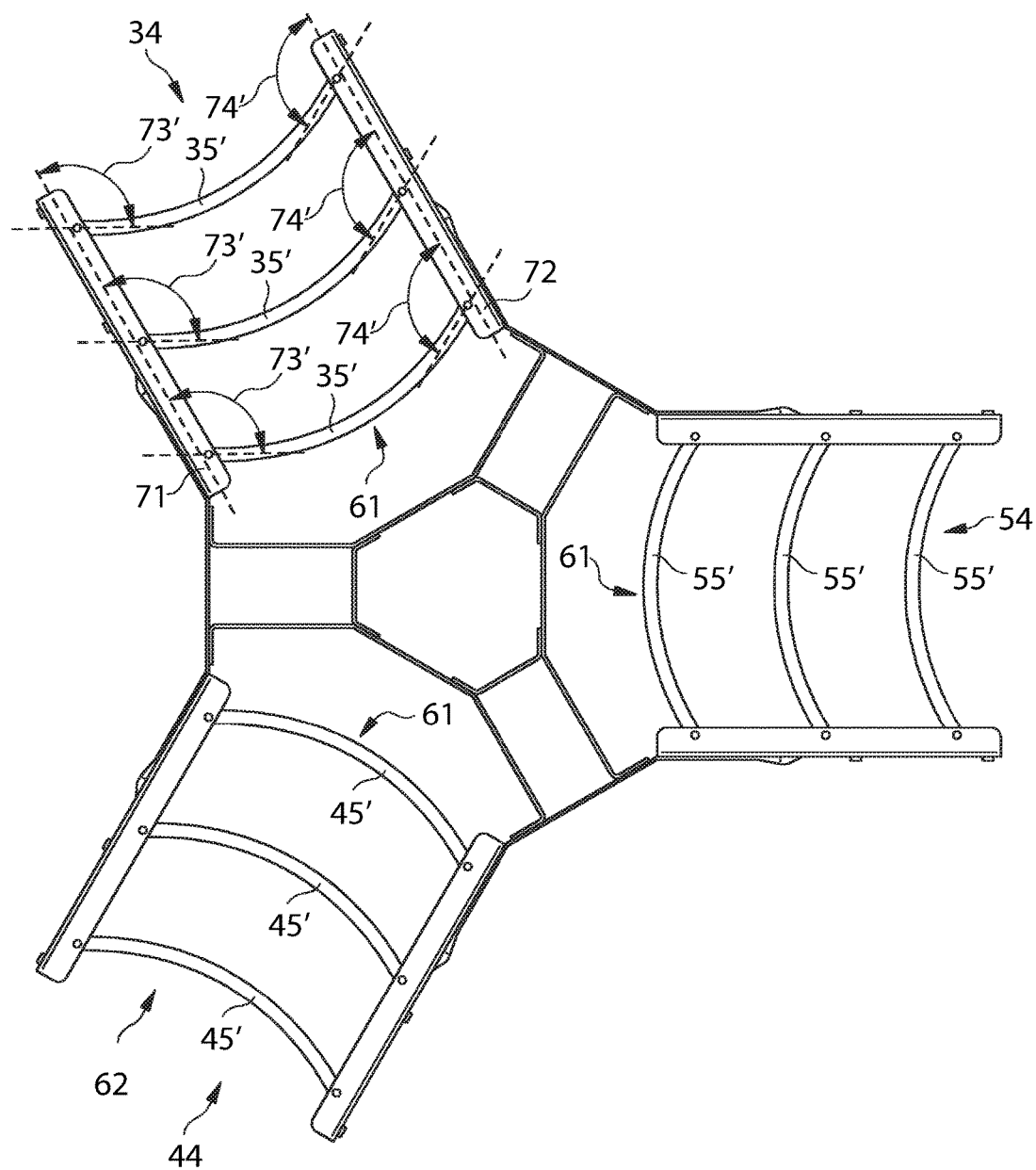
FIG. 4 shows an embodiment of an access system with ladders with bent rungs.

FIG. 4 shows an access system 60 which is similar to the access system 60 of FIG. 3, however featuring bent rungs instead of rungs comprising several separate units. More specifically, the access system 60 shown in FIG. 4 comprises a first ladder 34, a second ladder 44 and a third ladder 54. Each of the three ladders 34, 44, 54 comprises an inner end 61 and an outer end 62. Furthermore, the first ladder 34 comprises three bent first rungs 35', the second ladder 44 comprises three bent second rungs 45', and the third ladder 54 comprises three bent third rungs 55'. The three ladders 34, 44, 54 are identical to each other. Consequently, details and specifications explained for the first ladder 34 in the following are also applicable and valid for the second ladder 44 and the third ladder 54.

The first ladder 34 comprises a first rail 71 and a second rail 72 which are parallel to each other. A first angle 73' at the connection between the first rail 71 and the first rung 35' is built. As the first rungs 35' are curved or bent, it can be understood that a tangent of the first rung 35' at the connection between the first rung 35' and first rail 71 is taken for the determination of the first angle 73'. Likewise, a second angle 74' is defined between the first rung 35' and the second rail 72. The first angle 73' and the second angle 74' are both taken on the side which is facing the outer end 62. Finally, in some embodiments, the first angle 73' is 120 degrees and the second angle 74' is 120 degrees as well.

FIG. 5 shows an access system 60 with complementary angles 78, in particular, a first complementary angle and a second complementary angle. The first complementary angle 78 is defined as the angle which is achieved by subtracting the first angle 73 from 180 degrees. The second complementary angle 79 is defined as the angle which is achieved by subtracting the second angle 74 from 180 degrees.

Again, a hub 20 with a first flange 31, a second flange 41 and a third flange 51 is shown. Opposite to the first flange 31 is a first opening 33, opposite to the second flange 41 is a second opening 43, and opposite to the third flange 51 is a third opening 53. The hub 20 is rotatably mounted about a rotor access of rotation 15. In the following, there will be described that their exists nine rotational hub positions where a person can enter one of the three openings 33, 43, 53 and is able to step on one of the first rungs 35, 45, 55, wherein one of the first rungs 35, 45, 55 is horizontal.

The access system 60 comprises a first ladder 34, a second ladder 44 and a third ladder 54. The first ladder 34 comprises a first rung 35, a first rail and a second rail (both rails are not shown for the sake of simplicity). The first rung 35 comprises three units: a first unit 75, a second unit 76, and a third unit 77. The second unit 76, which is between the first unit 75 and the third unit 77, is in parallel to the first opening 33 and is perpendicular to the first rail and the second rail. The first unit 75 and the first rail build a first angle (not shown) and a first complementary angle 78. In some embodiments, the first complementary angle 78 is 60 degrees, thus, the first angle is 120 degrees. Likewise, the third unit 77 and the second rail build a second angle 74 (not shown) and a second complementary angle 79. The second complementary angle 79 can be 60 degrees; thus, the second angle can be 120 degrees.

In some embodiments, the first ladder 34 comprises one first rung 35. Alternatively, the first ladder 35 might also comprise several first rungs 35. The second ladder 44 and the third ladder 54 are identical to the first ladder 34. Thus, the previous features, which have been mentioned with regard to the first ladder 34, also apply to the second ladder 44 and the third ladder 54. In particular, each complementary angle 78, 79 for each ladder 44, 54 may be 60 degrees.

Furthermore, four directions can be defined. A first direction 37 is pointing downwards, while a fourth direction 67 is pointing upwards. A second direction 47 is pointing to the right, and a third direction 57 is pointing to the left. The plane where the second direction 47 and the third direction 57 lie in is also referred to as the horizontal plane.

A first rotor blade (not shown) is arranged and prepared to be mounted and attached to the first flange 31. Likewise, a second rotor blade (not shown) is arranged and prepared to be mounted and attached to the second flange 41; a third rotor blade (not shown) is arranged and prepared to be mounted and attached to the third flange 51.

In the following, the nine rotational hub positions will be described in detail: If the first rotor blade is in a first position 36, i.e. the first rotor blade is pointing in the first direction 37, then a person which intends to enter the hub 20 from an outside 22 into an interior 21 of the hub 20 can enter by the opening 33 and step onto the second unit 76 of the first rung 35 of the first ladder 34. In other words, the person could step onto a part of the first ladder 34 which is denoted in FIG. 5 by the reference sign 311. The part 311 is located horizontally, thus the person can enter the hub 20 safely and comfortably.

If the first rotor blade is in a second position, i.e. the first rotor blade is pointing in the second direction 47, the person can enter by the opening 53 and step onto a part of the third ladder 54, which is denoted by the reference sign 312. Again, the part 312 of the third ladder 54 is horizontal, such that an easy and safe entering is possible.

If the first rotor blade is in a third position, i.e. the first rotor blade is pointing in a third direction 57, then a person can enter by the opening 43 and step onto a part 313 of the second ladder 44. Again, the part 313 is horizontal.

If the second rotor blade is pointing in the first direction 37, the person can enter the hub 20 by the opening 43 and step onto a part 411 of the second ladder 44. The part 411 is horizontal, thus an easy and safe entering of the person is possible. If the second rotor blade is pointing in the second direction 47, the person can enter by the opening 43 and step onto a part 412 of the first ladder 34. The part 412 is horizontal. If the second rotor blade is pointing in the third direction 57, the person can enter by the opening 53 and step onto a part 413 of the third ladder 54. The part 413 is horizontal.

If, finally, the third rotor blade is pointing in the first direction 37, the person can enter by the opening 53 and step onto a part 511 of the third ladder 54. The entering is safe and comfortable as the first part 511 is horizontal. If the third rotor blade is pointing in the second direction 47, the person can enter by the opening 43 and step onto a part 512 of the second ladder 44. The part 512 is horizontal. If the third rotor blade is pointing in the third direction 57, the person can enter by the opening 33 and step onto a part 513 of the first ladder 34. The part 513 is beneficially horizontal.

In summary, for each of the nine rotational hub positions, a person entering the hub 20 from the outside 22 finds a part of one of the three ladders 34, 44, 54, which is horizontal.

In FIG. 6, a tower 11, a nacelle 12 and a hub 20 of a wind turbine are shown. A first rotor blade 32 is mounted, i.e. connected, to the hub 20. The hubs 20 with the first rotor blade 32 are rotatably mounted with regard to the nacelle 12. Rotation can be performed about a rotor access of rotation 15.

The first rotor blade 32 is in a first position 36 which is also referred to as a normal service position. The first position 36 is characterized by the fact that the first rotor blade 32 is pointing downwards in a first direction 37. In other words, the first rotor blade 32 is pointing in a direction which is the direction of a gravitational force 81 of the first rotor blade 32.

FIG. 7 shows the first rotor blade 32 of FIG. 6 in another position, namely a second position 46.

The second position 46 is characterized by the fact that the first rotor blade 32 is pointing in a second direction 47 which is rotated about 90 degrees in a counterclockwise rotational direction with regard to the first position 36. The second position 46 is also referred to as blade inspection position.

Finally, FIG. 8 shows a third position 56 of the first rotor blade 32. The third position 56 is also referred to as a single blade installation position. In the third position 56, the first rotor blade 32 points to a third direction 57, which is rotated about 90 degrees in a clockwise rotational direction with regard to the first position 36.

The invention claimed is:

1. An access system for a hub of a wind turbine, the hub comprising a first flange for mounting a first rotor blade, a second flange for mounting a second rotor blade, a third flange for mounting a third rotor blade, a first opening, a second opening, and at least a third opening, each of the first opening, the second opening, and the third opening being suitable for accessing an interior of the hub from an outside of the hub, the access system comprising:
   a first ladder with a plurality of first rungs, the first ladder extending inward from the first opening;
   a second ladder with a plurality of second rungs, the second ladder extending inward from the second opening; and
   a third ladder with a plurality of third rungs, the third ladder extending inward from the third opening;
   wherein at least the first ladder comprises a first rail and a second rail, the second rail being parallel to the first rail;
   wherein each rung of the plurality of first rungs extends from the first rail to the second rail, comprising a first angle between the plurality of first rungs and the first rail, and a second angle between the plurality of first rungs and the second rail;
   wherein the first angle and the second angle are each greater than 100 degrees;
   wherein, for each of a nine rotational hub positions, at least one part of a rung of at least one of: the first ladder, the second ladder, and the third ladder, is horizontal for a person entering the hub from an area outside the hub;
   wherein each of the plurality of first rungs comprises a first unit, a second unit and a third unit, further wherein:
      the first unit is attached to the first rail, the first angle is built between the first rail and the first unit, the third unit is attached to the second rail, the second angle is built between the second rail and the third unit, and the second unit connects the first unit and the third unit.

2. The access system according to claim 1, wherein each of the first ladder, the second ladder, and the third ladder comprise an outer end, which is directed towards one of the first opening, the second opening, and the third opening, and an inner end, which is opposite to the outer end, and the inner ends are mechanically joined to each other.

3. The access system according to claim 1, wherein the second unit is perpendicular to the first rail.

4. The access system according to claim 1, wherein the first angle is equal to the second angle.

5. The access system according to claim 1, wherein:
   the first angle is in a range between 115 degrees and 125 degrees and/or
   the second angle is in a range between 115 degrees and 125 degrees.

6. The access system according to claim 1, wherein:
   the hub comprises a first position, wherein the first rotor blade points to a first direction which is defined by a direction of a gravitational force acting on the first rotor blade,
   the hub comprises a second position, wherein the first rotor blade points to a second direction which is rotated about 90 degrees in a counter-clockwise rotational direction with regard to the first position,
   the hub comprises a third position, wherein the first rotor blade points to a third direction which is rotated 90 degrees in a clockwise rotational direction with regard to the first position, and for each of the first position, the second position, and the third position, a plurality of rungs are perpendicular to the direction where the first rotor blade points to.

7. The access system according to claim 1, wherein the wind turbine comprises a gearbox.

* * * * *